UNITED STATES PATENT OFFICE.

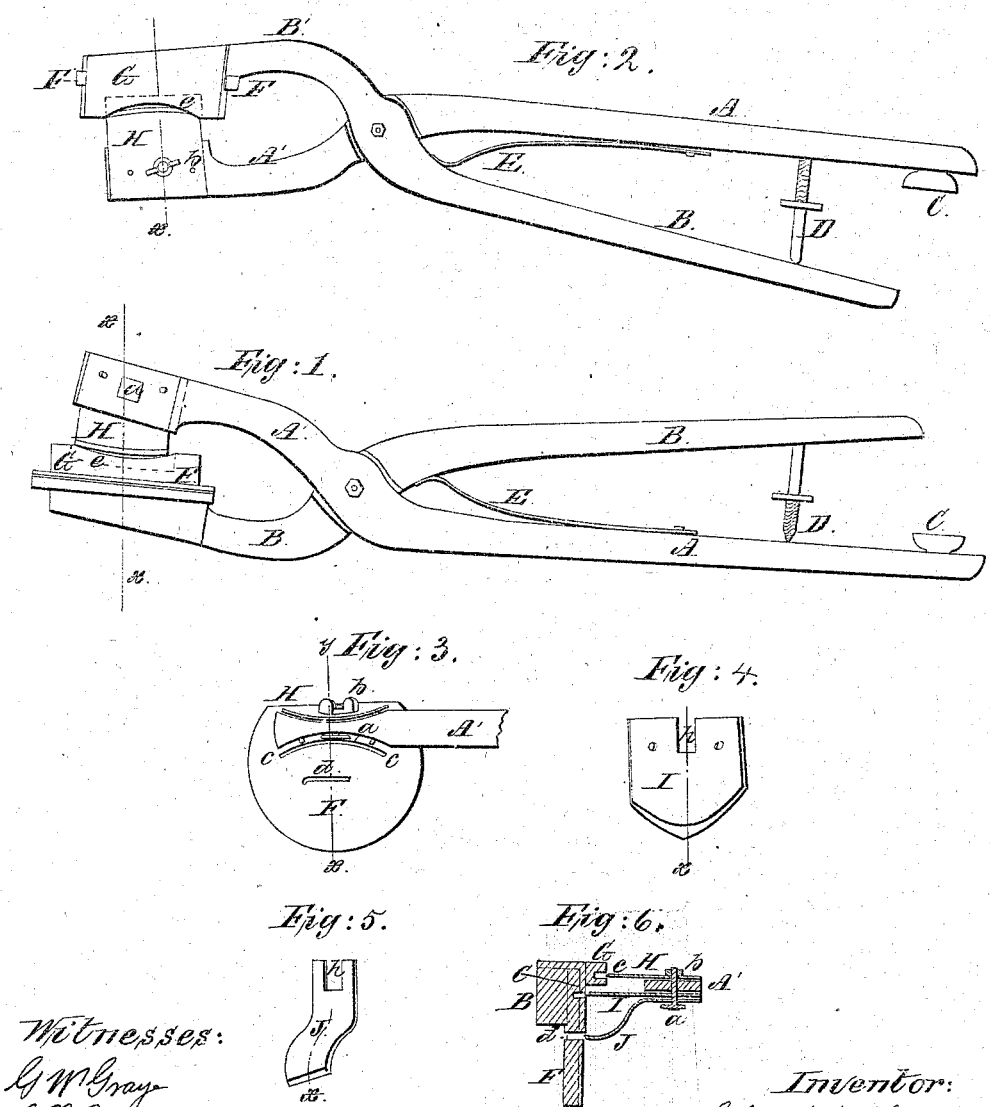

SILAS D. BALDWIN, OF CHICAGO, ILLINOIS.

IMPROVEMENT IN SHEARS FOR MARKING CATTLE.

Specification forming part of Letters Patent No. 47,785, dated May 23, 1865.

*To all whom it may concern:*

Be it known that I, SILAS D. BALDWIN, of the city of Chicago, county of Cook, and State of Illinois, have invented certain new and useful Improvements in Shears for Cutting, Marking, and Trimming Animals; and I do hereby declare that the following is a full, clear, and exact description of the same, reference being had to the annexed drawings, making a part of this specification, in which—

Figure 1 is a top view, with the shear-blade I removed; Fig. 2, a reverse view; Fig. 3, a front view of the slotted plate; Fig. 4, the upper shear-blade; Fig. 5, a removable cutter or die; Fig. 6, a transverse section at the red lines *x x*.

Like letters refer to similar parts in all of the figures.

The nature of my invention consists in constructing shears for the purpose of cutting, trimming, or marking swine, sheep, and cattle; in providing such shears with an adjustable shear blade or cutter having a conically-formed edge which passes through a slot so as to produce a shear or two-edged cut; in beveling the inner side of a concave adjustable shear-blade so as to produce a sharp edge and also prevent cutting when sliding the shears into position; in providing the opposite arm of the shears with a slotted plate or plate having one or more slots and a projection; in attaching a knife or cutter to the reverse side of the opposite arm which has a circular edge; in placing two or more shear blades or cutters on the same arm of the shears; in passing the circular-edged knife or cutter into a corresponding slot in the projection of the plate on the opposite arm; in providing a spring between the handles of the arms so as to make the operation of the instrument nearly instantaneous; in providing the handles with a guard or set-screw so as to regulate the depth of the entrance of the shear blades into the plate, and thereby regulate the width of the cut; in attaching a lubricating depository or cap to one of the handles; in providing the shear-blades with slots and the arm with a set-screw so as to make the shear-blades adjustable and removable; in providing an extra cutter or die changeable in form for marking purposes, and in the several combinations hereinafter claimed.

To enable other skilled in the art to make and use my invention, I will proceed to describe its construction and operation.

The handles A and B, with their arms, are made of malleable cast-iron or other suitable material, and are about one foot in length. When I attach a lubricating depository to the bevel, I make one of them a little longer. They are crossed at about one-third the distance from the shear end. At or near the end of the arm B', I attach a plate, F, facing the opposite arm. This plate is circular and about two inches in diameter. The form, however, is not material. For the convenience of description I use the terms upper and lower relative to the position shown at Fig. 1, as there is in regard to the instrument no proper upper or lower sides. At the lower side of the plate F, I attach a projection, G, which projection presents a concave face to the opposite arm, and is provided with a slot, *e*, fitted to the form of the blade or cutter H. That portion of the projection G which is below the slot may be removed and still preserve a shear cut and operate well; but I prefer a slot. Above this projection I insert another slot, *c*, in the plate F, circular in form and fitted to the form of the blade I, which is attached to the upper side of the arm A'. Above the slot *c*, I insert another slot, *d*, near the center of the plate, which is fitted to the form of the blade or cutter J.

The plate F, projection G, and arm B' and handle B are usually made of one piece; but the plate or projection may be made of separate pieces and attached by screws or in any other suitable manner.

To the arm A', I attach a concave blade or cutter, H, at the under side, which cuts into or against the projection G at the slot *e*, and the edge is so formed as to give a shear cut, and I use this blade and arrangement for trimming the hoofs of sheep. This blade, as well as the others, is attached by the set-screw *a* and *b*, and when not used is removed. On the upper side of said arm A', I attach the blade or knife I by sliding it by means of the slot *h* under the head *a* of the set-screw, and by means of this slot and set-screw I adjust the cut of the blade in a measure. The edge of this blade I make conical in form, so as to give it a shear cut, and as shown, cuts both ways from the point or apex of the blade and cuts against the lower edge of the slot c. This blade is also concave in form, and in forming the edge I bevel the inner side, as shown at Fig. 4, for two purposes—one is to prevent cutting while the instrument is being placed in position or, when in position, prevent cutting before the blade comes to the proper point, the other being to secure a good shear cut. This blade I may be attached to the arm by other suitable means than the set or thumb screw shown.

I also provide another blade, J, which is attached to the upper side of the arm in a similar manner to the blade I, and may be attached in addition to that blade or by removing it. This blade is bent upward and intersects the plate F near its center, and passes through it at the slot d. This blade has also a shear cut by reason of one side being longer than the other. In the form shown the cut is straight; but it is designed to have this blade vary in form, so that each person can have it formed to suit any ear-mark he may have adopted for marking cattle, sheep, swine, or other animal, as it is designed for marking purposes, and it may have a shear cut, as shown, or a die cut by cutting against the plate F instead of through it, and can be used in connection with the blades I and H, or either of them, or without them. Between the handles A and B, I insert the spring E for the purpose of loosening the shears as soon as the operation is performed, so as to prevent tearing or mangling the flesh.

I also place a guard or set-screw, D, between the handles for the purpose of regulating the depth of the cut of the blades, and by this and the form of the edge of blade I, I can also regulate the width of the cut.

I also attach to one of the handles or arms the lubricating depository or cup C, which is made by attaching a small cup or making a cavity in the arm or handle. This is a matter of convenience rather than of necessity, as it is necessary to oil the blades after use in order to preserve them, but not necessary, of course, that oil should be carried in the shears.

When this instrument is complete, it forms a very useful implement, and one which will be found exceedingly satisfactory in its operation.

Having thus fully described my invention and its operation, what I claim as my invention, and desire to secure by Letters Patent, is—

1. The adjustable blade I, when provided with a conical-shaped edge so as to give it a shear cut.

2. The slot h in the back of the blades I and J, in combination with the screw b.

3. The combination of the conical-edged blade I, handles A and B, with the set-screw or guard D, to regulate the width and depth of the incision.

4. The plate F, provided with the projection G and slots c, d, or e.

5. The concave blade H, in combination with the projection G.

6. Placing two or more shear-blades on a single arm of a pair of shears.

7. In combination with the cutting devices hereinbefore described, the adjustable blade or die J, in the manner and for the purpose set forth.

8. The lubricating depository or cup C, when attached to the handle or arm of a pair of shears.

9. The combination of the slotted plate F, blades I or H, spring E, and guard D with the handles A and B.

SILAS D. BALDWIN.

Witnesses:
L. L. BOND,
GEORGE W. GRAY.